US007826839B1

(12) United States Patent
Nicholas

(10) Patent No.: US 7,826,839 B1
(45) Date of Patent: Nov. 2, 2010

(54) COMMUNICATION SYSTEM TO FACILITATE AIRBORNE ELECTRONIC ATTACK

(75) Inventor: David C. Nicholas, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1079 days.

(21) Appl. No.: 11/343,139

(22) Filed: Jan. 30, 2006

(51) Int. Cl.
*H04Q 7/20* (2006.01)

(52) U.S. Cl. ............................ 455/431; 455/73; 455/1; 455/430; 455/500; 455/502; 455/98; 455/12.1; 455/103; 455/63.1; 455/114.2; 455/427; 342/357.02; 342/357.12; 342/357.14; 342/14; 342/45

(58) Field of Classification Search .................. 455/73, 455/1, 103, 431, 430, 502, 500, 63.1, 427, 455/98, 12.1, 114.2; 342/45, 14, 357.12; 375/142, 134; 380/34
See application file for complete search history.

(56) References Cited

U.S. PATENT DOCUMENTS

| | | | | | |
|---|---|---|---|---|---|
| 3,879,732 | A | * | 4/1975 | Simpson | 342/14 |
| 4,275,396 | A | * | 6/1981 | Jacomini | 342/93 |
| 5,260,707 | A | * | 11/1993 | Goldman | 342/16 |
| 5,502,446 | A | * | 3/1996 | Denninger | 342/357.08 |
| 5,835,857 | A | * | 11/1998 | Otten | 455/410 |
| 5,896,105 | A | * | 4/1999 | Murphy et al. | 342/368 |
| 5,950,110 | A | * | 9/1999 | Hendrickson | 455/1 |
| 6,049,561 | A | * | 4/2000 | Pezzlo et al. | 375/132 |
| 6,108,523 | A | * | 8/2000 | Wright et al. | 455/66.1 |
| 6,108,561 | A | * | 8/2000 | Mallinckrodt | 455/522 |
| 6,112,052 | A | * | 8/2000 | Guthrie et al. | 455/1 |
| 6,300,898 | B1 | * | 10/2001 | Schneider et al. | 342/357.09 |
| 6,353,734 | B1 | * | 3/2002 | Wright et al. | 455/98 |
| 6,448,925 | B1 | * | 9/2002 | Shridhara | 342/357.02 |
| 6,591,110 | B1 | * | 7/2003 | Kim et al. | 455/453 |
| 6,697,008 | B1 | * | 2/2004 | Sternowski | 342/14 |
| 6,727,841 | B1 | * | 4/2004 | Mitra | 342/25 R |
| 6,771,214 | B2 | * | 8/2004 | Kober et al. | 342/357.12 |
| 6,775,545 | B2 | * | 8/2004 | Wright et al. | 455/431 |
| 7,010,262 | B2 | * | 3/2006 | Tyson | 455/1 |
| 7,339,524 | B2 | * | 3/2008 | Zimmerman et al. | 342/458 |
| 7,339,526 | B2 | * | 3/2008 | Zimmerman | 342/464 |
| 7,342,538 | B2 | * | 3/2008 | Zimmerman | 342/464 |
| 7,532,160 | B1 | * | 5/2009 | Zimmerman et al. | 342/357.14 |
| 7,570,214 | B2 | * | 8/2009 | Smith et al. | 342/463 |
| 2003/0164794 | A1 | * | 9/2003 | Haynes et al. | 342/353 |

* cited by examiner

*Primary Examiner*—Marceau Milord
(74) *Attorney, Agent, or Firm*—Matthew J. Evans; Daniel M. Barbiert

(57) ABSTRACT

A method of disrupting communications reception of a target radio receiver. A plurality of transmitters transmit a noise signal toward the target radio transceiver. Each of the plurality of transmitters has a receiver associated therewith A first transmitter ceases transmitting a noise signal at a pre-determined time. A receiver associated with the first transmitter receives information from another of the plurality of transmitters when the first transmitter has ceased transmitting the noise signal. The first transmitter resumes the transmission of the noise signal after the information has been transmitted.

13 Claims, 2 Drawing Sheets

COMMUNICATION SYSTEM TO FACILITATE AIRBORNE ELECTRONIC ATTACK

FIELD OF THE INVENTION

The invention relates to wireless communications, and more particularly, to communications between transceivers conducting electronic warfare against a target.

BACKGROUND OF THE INVENTION

Most communications systems require a minimum signal to noise ratio (SNR) of about 10 dB (10 to 1) after signal processing and decoding in order to perform effectively. The act of jamming a signal transmits noise to a target receiver to reduce the SNR to a point at which the signal can no longer be differentiated from the noise. When performed effectively, signal jamming can be an important aspect of electronic warfare.

Here a transceiver consists of a receiver co-located with at least one transmitter. One method of jamming a target signal is for multiple friendly jamming transmitters to launch coordinated noise transmissions on frequencies the target signal may use, so as to effectively disable one or more enemy receivers. Such jamming may be directional and also require coordination of target selection in direction. In such a coordinated attack, communication between jammers both as to target selection, direction, and mode of jamming may be necessary for effective jamming. However, one challenge of jamming is that the jamming may interfere with communications of friendly transceivers. If the frequencies to be jammed are the same or near the frequencies used to communicate with friendly transceivers, jamming will have the negative consequence of interfering with or even preventing coordination and communication between such friendly transceivers.

A similar concern in jamming communications systems is known as the co-site problem. Briefly stated, all transmitters emit unwanted spurious emissions outside their intended band of operations. Large transmitters, which may be necessary in some jamming missions, have large spurious emissions. For this reason transmission sites are often located many miles from receiver sites, but this is impractical in many military operations, and is certainly impractical when a transmitter and a receiver are located on the same aircraft. In order to receive a message while jamming, an airborne transceiver may have to shut down its jamming transmissions on all frequencies—or at least on a wide band of frequencies around the frequency upon which it is desired to receive. Such a shut-down of jamming by a transmitter limits the effectiveness of the jammer. A second fellow jammer located some distance away might be able to continue jamming except on the specific frequency used for friendly communication by the first jammer. The jammer which shut down only on the friendly communications frequency would likely not be able to receive because of spurious transmissions from its own transmitter.

It is therefore an object of the invention to provide a communications system that permits communications between transceivers conducting jamming operations against a target transmitter.

It is another object of the invention to provide such a communications system that maintains signal jamming of the target signal during communications between friendly transceivers.

A feature of the invention is a jamming protocol having coordinated or synchronized silent periods during which friendly transceivers may communicate.

An advantage of the invention is that jamming missions can be effectively coordinated and maintained by multiple jamming transceivers.

SUMMARY OF THE INVENTION

The invention provides a method of disrupting communications reception of a target radio receiver. According to the method, each of a plurality of transmitters transmits a noise signal toward the target radio receiver. Each of the plurality of transmitters has a receiver associated therewith. A first transmitter ceases transmitting a noise signal at a pre-determined time. A receiver associated with the first transmitter receives information from another transmitter when the first transmitter has ceased transmitting the noise signal. The first transmitter resumes the transmission of the noise signal after the information has been received.

The invention also provides a communications jamming system. First and second transmitters are configured to transmit a jamming signal that degrades communication reception of an enemy target receiver. First and second receivers are associated with the first and second transmitters, respectively. A synchronization protocol, available to the first and second transmitters, causes the first and second transmitters to cease transmitting the jamming signal at a predetermined time and for a predetermined duration so that a message transmitted from the first transmitter is received by the second receiver.

In one variation, when separation is sufficient to avoid the cosite problem, the receiving friendly transmitter shuts down completely to avoid its own cosite interference, but the transmitting friendly unit shuts down jamming only on the frequency band used to communicate with the receiving friendly unit, and then transmits the communications signal in that band.

The invention further provides a system for interfering with reception of radio signals. The invention provides means for transmitting a noise signal toward a target radio transceiver; means for ceasing the transmission of the noise signal at a pre-determined time; means for transmitting information among the means for transmitting the noise signal when the noise signal has ceased; and means for resuming the transmission of the noise signal after the information has been transmitted.

DETAILED DESCRIPTION OF THE DRAWINGS

Figure 1:
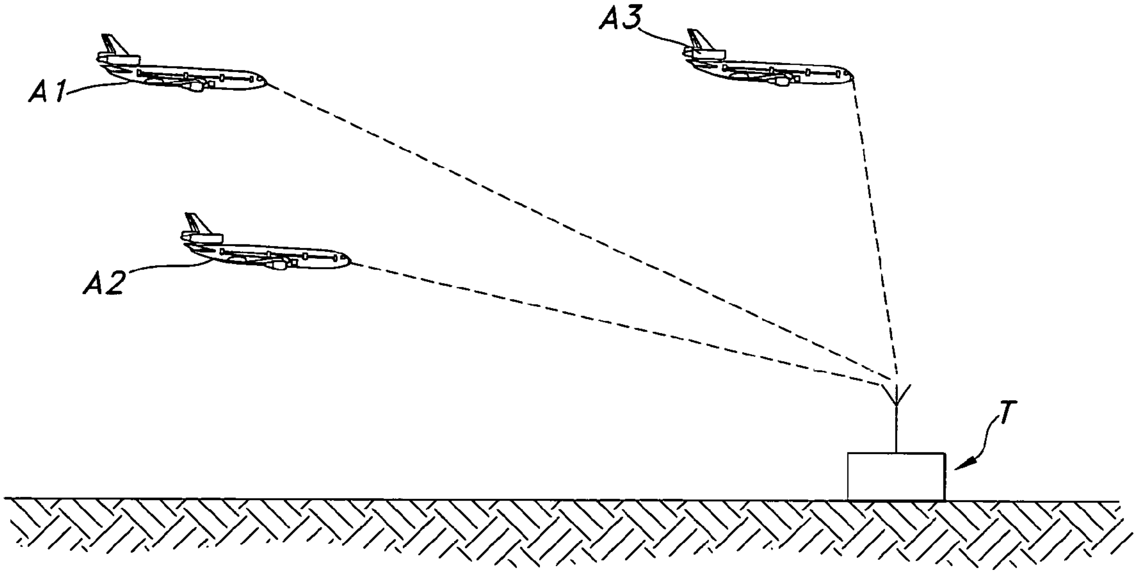
FIG. 1 is a schematic diagram of a group of aircraft and a communications jamming target.
Figure 2:
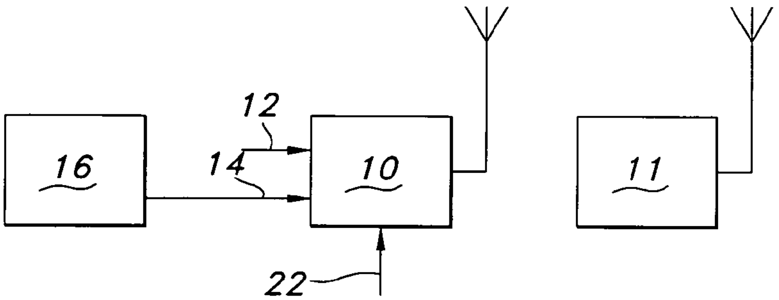
FIG. 2 is a schematic diagram of a transmitter that may be used with the invention.

FIG. 1 shows a plurality of aircraft A1, A2 and A3 that are configured to jam communications of a target T. Target T is depicted as being ground-based but may alternatively be airborne or ship-borne. Each aircraft A1, A2, A3 has a transmitter 10 and a receiver 11 disposed thereon. As shown in FIG. 2, a transmitter 10 suitable for use with the invention accepts analog or digital information to be transmitted from data input 12. According to known principles, transmitter 10 converts the data from data input 12 into radio signals and transmits the data for distant receivers to detect and process. Using a transmitter such as transmitter 10, each aircraft A1, A2 and A3 transmits a noise signal or other disruptive signal on frequencies anticipated or known to be used by target T. Such transmission of a noise signal or other disruptive signal jams, disrupts, or otherwise prevents communication by target T.

Figure 3:
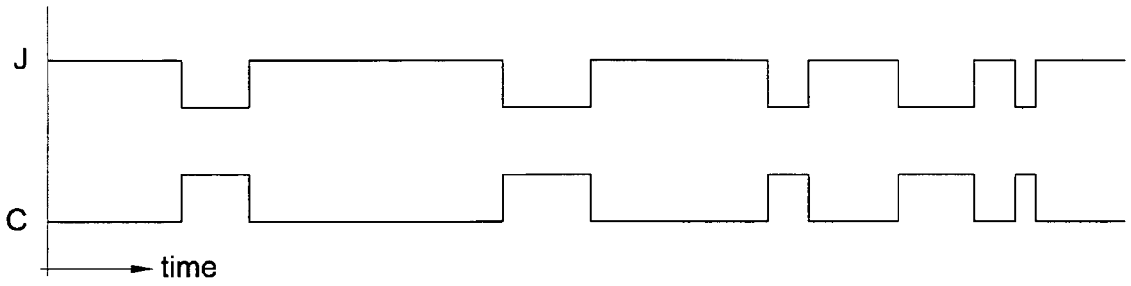
FIG. 3 is a graph of a jamming transmission and a communications transmission.

As previously stated, the invention provides a communications system that includes multiple jamming transmitters that synchronize the turning on and off of their jamming signals to enable communications between the jamming transmitters. FIG. 3 graphically depicts a jamming communications protocol used by transmitter 10 wherein the jamming transmission J is reduced or eliminated for relatively short periods of time. During the periods of time when the jamming signal is reduced or eliminated, a communications signal C can be transmitted to receivers 11 on each aircraft. The communications signal may include jamming information relevant to target selection, jamming frequency, jamming waveform, and other jamming parameters, so that the electronic attack on target T is increased in effectiveness. In one embodiment of the invention, each transmitter on aircraft A1, A2 and A3 ceases transmitting jamming signals at the same periods of time, and transmissions between the aircraft can thereby occur without interference from the jamming signals. To ensure each transmitter ceases jamming at the same time, a synchronization signal 14 (FIG. 2) is input into each transmitter. Synchronization signal 14 is generated by a synchronizing source 16, which may be a precise time source to provide a time-base reference, from which the exact on-off intervals are determined by a pseudo-random number generator driven by a key known to all users. Synchronization signal 14 provides, to each transmitter, timing instructions, so that the jamming signals from aircraft A1, A2 and A3 cease at the same time. If transmitter 10 is capable of transmitting on a plurality of frequencies or modes using spread spectrum, frequency hopping, phase modulation or other known strategies, synchronization signal 14 may provide sufficient instructions to vary the duration, frequency, and/or phase of the jamming 'quiet times' according to the frequency/mode protocol in use. In this manner, jamming transmissions do not interfere with communications between jamming transmitters. If the synchronization signal is produced based upon a strategy or protocol not generally known and not easily predictable, for example if the synchronization signal is cryptographically varied, target T will not be able to successfully receive during the quiet times from a fellow enemy transmitter, because the enemy transmitter will not be able to predict the quiet times. Note that the friendly communications signal transmitted during the quiet times also serves as a jamming signal to the enemy target receiver T.

Figure 4:
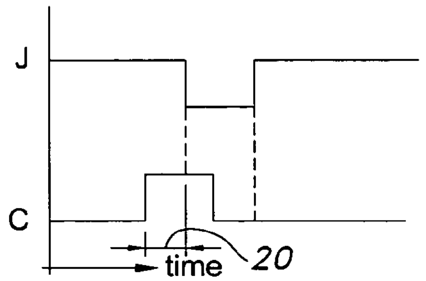
FIG. 4 is a graph of a jamming transmission and a communications transmission according to another embodiment of the invention.

To further prevent the jamming target from detecting and transmitting during the jamming quiet times, the jamming quiet times should be as short in duration as possible. However, if an extremely short communication begins to be transmitted to a receiver co-sited with a distant jamming transmitter at the beginning of an extremely short jamming quiet time, because of the travel time message delay the distant receiver may not fully receive the message before the jamming quiet time is over. According to another embodiment of the invention, therefore, to compensate for travel-time message delay a transmission to a distant receiver begins to be transmitted prior to the beginning of an upcoming jamming quiet time of a transmitter co-sited with the distant receiver. As shown in FIG. 4, a transmitted signal T begins to be transmitted an amount of time 20 prior to a cessation of the jamming transmission J of the distant receiver. The amount of time 20 can be varied depending on the distance to the distant transmitter and receiver. A location input 22 (FIG. 1) may therefore be provided to supply the location of the distant transmitter/receiver to transmitter 10. Location input 22 may supply location data of itself and other friendly aircraft A1, A2, A3 through global position information and/or location information embedded in messages transmitted by the various friendly aircraft. Getting started might require a longer quiet interval, so that position information can be received initially. Quiet intervals could then be shortened. Location could come from the Global positioning System (GPS), if GPS is available during jamming, or from an Inertial Navigation Unit, or from any other means available.

A common characteristic of radio transmitters is that they emit power at frequencies other than their intended frequency. These emissions, known as spurious emissions, are at low power relative to the intended message. However, when a transmitter is located near a receiver, for example on the same aircraft, the transmitter often interferes with the receiver at nearly all frequencies. Thus in order for aircraft A1 to receive a signal from another aircraft A2 or A3, aircraft A1 must cease jamming transmissions on all frequencies—or, at the very least, on a wide band of frequencies around the desired receive frequency. Other jamming aircraft A2, A3 will typically be far enough away that they need only to avoid jamming the specific frequency to be received by the other jamming aircraft, because spurious emissions from aircraft A2 and A3 are weak enough at a distance not interfere with reception at A1. Only spurious emissions from aircraft A1 are strong enough to interfere with the co-sited receiver at aircraft A1. As explained above the frequency aircraft A1 is to receive, and thus the frequencies the jamming transmitters at aircraft A2 and A3 are to avoid, are all varied over time in a synchronized fashion according to the synchronization signal, which variations are cryptographically varied to avoid prediction by the enemy. A transmitter, for example on board one of aircraft A2 and A3, can then transmit to the communications receiver on aircraft A1 during these gaps or quiet times, also synchronously following the same variable pattern. Using this scheme the jammers of all aircraft except aircraft A1 are active all the time and the frequencies used for communications are effectively jammed except when actually used for communications. Since the communications frequency pattern is variable in a non-obvious and non-predictable pattern, even these frequencies cannot be exploited by the enemy. Also the friendly communications signal itself serves to jam the enemy receiver even during these quiet intervals.

The invention may be varied in many ways while maintaining the spirit of the invention. For example, the transmitters and receivers may be mounted in aircraft such as fixed-wing, rotary, or unmanned aerial vehicles (UAVs). Alternatively the transmitters and receivers may be mounted in ground-based vehicles, ships, or at fixed ground stations. The transmitter and receiver are depicted as separate units that may be placed at different parts of an aircraft or other platform, but may also be parts of an integral transceiver as is known in the art.

An advantage of the invention is that jamming transmitters are able to communicate with one another, through associated receivers, in a manner that does not significantly reduce the effectiveness of the jamming.

Another advantage is that the relatively short pauses or cessations of jamming are varied using a non-obvious and non-predictable pattern, which as previously stated prevents the pauses from being used by the jamming target to communicate.

Still another advantage of the invention is that only those jamming signals that would prevent communications are paused during the communications.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

The invention claimed is:

1. A method of disrupting communications reception of a target radio receiver, comprising:
- a plurality of transmitters transmitting a noise signal toward the target radio transceiver, each of the plurality of transmitters having a receiver associated therewith;
- one of the plurality of transmitters ceasing transmitting a noise signal at a predetermined time;
- a receiver associated with said one of the plurality of transmitters receiving information from another of the plurality of transmitters when said one of the plurality of transmitters has ceased transmitting the noise signal;
- said one of the plurality of transmitters resuming the transmission of the noise signal after the information has been transmitted;
- wherein at least one of the plurality of transmitters cease transmitting the noise signal at the predetermined time, and further wherein said at least one of the plurality of transmitters resume transmitting the transmission of the noise signal after the information has been transmitted;
- determining an amount of time necessary for the information to be transmitted from one of the plurality of transmitters to a receiver associated with another of the plurality of transmitters; and
- beginning the transmission of the information prior to said another of the plurality of transmitters ceasing the transmission of the noise signal such that the information arrives at said another of the plurality of transmitters when said another of the plurality of transmitters ceases transmission of the noise signal.

2. The method of claim 1, wherein said one of the plurality of transmitters ceases transmitting the noise signal for a predetermined duration, and further wherein the predetermined duration is varied.

3. The method of claim 1, wherein the receiver associated with each of the plurality of transmitters is configured to receive information on a plurality of frequencies, and further wherein said one of the plurality of transmitters ceases transmitting the noise signal at frequencies surrounding a predetermined frequency upon which the information is to be transmitted by said one of the plurality of transmitters.

4. The method of claim 3, wherein the remainder of the plurality of transmitters cease transmitting the noise signal only at the predetermined frequency.

5. The method of claim 4 wherein the predetermined frequency is scheduled through use of a pseudo-random process available to each of the plurality of transmitters.

6. The method of claim 1, wherein the predetermined time is scheduled through use of a pseudo-random process available to each of the plurality of transmitters.

7. A communications jamming system, comprising:
- first and second transmitters, each configured to transmit a jamming signal that degrades communication of a target transceiver;
- first and second receivers associated with the first and second transmitters, respectively;
- a synchronization protocol, available to the first and second transmitters, that causes the first and second transmitters to cease transmitting the jamming
- signal at a predetermined time and for a predetermined duration, so that a message transmitted from the first transmitter is received by the second receiver; and
- wherein the first and second transmitters are configured to transmit on a plurality of frequencies, and further wherein the first and second receivers are configured to receive on the plurality of frequencies, and further wherein the synchronization protocol determines which of the plurality of frequencies the message is to be transmitted on at the predetermined time, and further wherein the synchronization protocol determines the length of the predetermined duration.

8. The communications jamming system of claim 7, wherein the synchronization protocol is based upon a pseudo-random code.

9. The communications jamming system of claim 7, wherein the first transmitter ceases transmitting the jamming signal at frequencies surrounding a predetermined frequency upon which the information is to be received by the first receiver.

10. The method of claim 9, wherein the second transmitter ceases transmitting the noise signal only at the predetermined frequency.

11. The method of claim 7, wherein at least one of the first and second transmitters is mounted in an aircraft.

12. A system for interfering with reception of radio signals, comprising:
- means for transmitting a noise signal toward a target radio transceiver;
- means for ceasing the transmission of the noise signal at a pre-determined time;
- means for transmitting information among the means for transmitting the noise signal when the noise signal has ceased;
- means for resuming the transmission of the noise signal after the information has been transmitted;
- wherein the means for transmitting comprises a plurality of transmitters configured for transmitting on a plurality of frequencies;
- wherein each of the plurality of transmitters has a means for receiving radio signals associated therewith;
- wherein the means for receiving are configured to receive information on a plurality of frequencies, and further comprising, at one of the transmitters, means for ceasing transmission of the noise signal at frequencies surrounding a predetermined frequency to be used by the means for transmitting information;

means for ceasing transmission of the noise signal at the remainder of the plurality of transmitters only at the predetermined frequency, and for a predetermined duration of time; and wherein a synchronization protocol determines which of the plurality of frequencies a message is to be transmitted on at a predetermined time, and further wherein the synchronization protocol determines a length of the predetermined duration of time.

13. The system of claim 12, wherein a means for synchronizing the predetermined time among the means for transmitting.

* * * * *